US008897992B2

(12) United States Patent
Ohori et al.

(10) Patent No.: US 8,897,992 B2
(45) Date of Patent: Nov. 25, 2014

(54) CONTROL DEVICE FOR INTERNAL COMBUSTION ENGINE

(71) Applicants: Shinya Ohori, Toyota (JP); Daigo Ando, Nagoya (JP)

(72) Inventors: Shinya Ohori, Toyota (JP); Daigo Ando, Nagoya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/722,773

(22) Filed: Dec. 20, 2012

(65) Prior Publication Data

US 2013/0160727 A1   Jun. 27, 2013

(30) Foreign Application Priority Data

Dec. 21, 2011   (JP) ................................. 2011-279574

(51) Int. Cl.
| | |
|---|---|
| *B60T 7/12* | (2006.01) |
| *B60W 10/06* | (2006.01) |
| *B60W 20/00* | (2006.01) |
| *F01L 1/34* | (2006.01) |
| *F02D 13/02* | (2006.01) |
| *F01L 1/344* | (2006.01) |
| *B60K 6/24* | (2007.10) |

(52) U.S. Cl.
CPC ... *F01L 1/34* (2013.01); *B60W 10/06* (2013.01); *B60W 20/40* (2013.01); *F01L 2800/03* (2013.01); *B60W 20/00* (2013.01); *F02D 13/0238* (2013.01); *F01L 1/3442* (2013.01); *B60K 6/24* (2013.01)

USPC ......................................... 701/103; 123/90.15

(58) Field of Classification Search
USPC ............. 701/103, 112, 113; 123/90.15, 90.16
See application file for complete search history.

(56) References Cited

U.S. PATENT DOCUMENTS

| | | | | |
|---|---|---|---|---|
| 8,280,614 | B2 * | 10/2012 | Kaneko et al. | 701/105 |
| 8,423,271 | B2 * | 4/2013 | Gibson et al. | 701/112 |
| 2010/0131180 | A1 | 5/2010 | Hattori et al. | |
| 2010/0235067 | A1 | 9/2010 | Nomura et al. | |
| 2011/0010077 | A1 * | 1/2011 | Kaneko et al. | 701/104 |
| 2013/0166185 | A1 * | 6/2013 | Ando | 701/112 |

FOREIGN PATENT DOCUMENTS

| | | |
|---|---|---|
| JP | 07-233713 A | 9/1995 |
| JP | 2001-263117 A | 9/2001 |
| JP | 2007-327472 A | 12/2007 |
| JP | 2008-038651 A | 2/2008 |
| JP | 2008-267234 A | 11/2008 |
| JP | 2009-156217 A | 7/2009 |
| JP | 2010-270795 A | 12/2010 |
| JP | 2012-031742 A | 2/2012 |

* cited by examiner

*Primary Examiner* — John Kwon
(74) *Attorney, Agent, or Firm* — Kenyon & Kenyon LLP

(57) ABSTRACT

A control device for an internal combustion engine includes: a variable valve timing mechanism that changes a valve timing; and a control unit that controls a change of the valve timing. The control unit sets an engine stop request-time target valve timing that is a target valve timing at the time when a request for an engine stop is issued, starts control for changing the valve timing coincides with the engine stop request-time target valve timing and causes the internal combustion engine to operate at an idle at the time when the request for the engine stop is issued, starts a process of stopping operation of internal combustion engine at the time when the valve timing has reached a predetermined valve timing.

10 Claims, 8 Drawing Sheets

F I G. 7
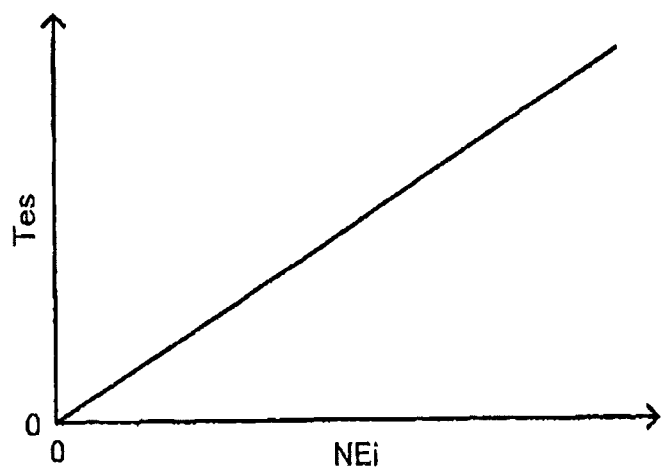

CONTROL DEVICE FOR INTERNAL COMBUSTION ENGINE

INCORPORATION BY REFERENCE

The disclosure of Japanese Patent Application No. 2011-279574 filed on Dec. 21, 2011 including the specification, drawings and abstract is incorporated herein by reference in its entirety.

BACKGROUND OF THE INVENTION

1. Field of the Invention

The invention relates to a control device for an internal combustion engine.

2. Description of Related Art

A control device for an internal combustion engine, which includes a variable valve timing mechanism that changes a valve timing, is described in, for example, Japanese Patent Application Publication No. 2007-327472 (JP 2007-327472 A). In JP 2007-327472 A, a target valve timing at the time when a request to stop the operation of the internal combustion engine (hereinafter, referred to as engine stop) is issued (hereinafter referred to as an engine stop request-time target valve timing) is set, and control for changing the valve timing such that the valve timing coincides with the engine stop request-time target valve timing (hereinafter referred to as engine stop request-time valve timing control) is started at the time when an engine stop request is issued. In this control, a process of stopping the operation of the internal combustion engine (hereinafter referred to as an engine stop process) is started when a predetermined period of time (hereinafter referred to as a predetermined idling extension time) has elapsed from when the engine stop request is issued.

The time that is needed from the start of the engine stop process to the stop of the operation of the engine (hereinafter referred to as an engine stop time) differs depending on the operation state of the internal combustion engine at the time when engine stop is requested. The time that is needed until the valve timing is made to coincide with the engine stop request-time target valve timing through engine stop request-time valve timing control (hereinafter referred to as a valve timing control time) differs depending on the valve timing at the time when engine stop is requested, and the engine stop request-time target valve timing. In Japanese Patent Application Publication No. 2007-327472 (JP-2007-327472 A), the aforementioned predetermined idling extension time is set to a certain time. Thus, in the case where the engine stop time is relatively long or the valve timing control time is relatively short, the valve timing may reach the engine stop request-time target valve timing before the operation of the engine is stopped. In this case, the fuel economy of the internal combustion engine may deteriorate correspondingly to idling operation of the internal combustion engine. On the other hand, in Japanese Patent Application Publication No. 2007-327472 (JP-2007-327472 A), in the case where the engine stop time is relatively short or the valve timing control time is relatively long, the operation of the engine may be stopped before the valve timing reaches the engine stop request-time target valve timing. In this case, it may be impossible to make the valve timing reach the engine stop request-time target valve timing.

The invention makes the valve timing coincide with the engine stop request-time target valve timing when the operation of the internal combustion engine is stopped, and restrains the fuel economy of the internal combustion engine from deteriorating.

SUMMARY OF THE INVENTION

The invention relates to a control device for an internal combustion engine that includes a variable valve timing mechanism that changes a valve timing. In a first aspect of the invention, a control device for an internal combustion engine includes a control unit that controls changing of the valve timing. The control unit sets an engine stop request-time target valve timing that is a target valve timing at a time when engine stop that is stop of operation of the internal combustion engine is requested, starts engine stop request-time valve timing control as control of changing the valve timing such that the valve timing coincides with the engine stop request-time target valve timing when the engine stop is requested, operates the internal combustion engine in an idling state for a predetermined time after the engine stop is requested, and starts an engine stop process as a processing of stopping operation of the internal combustion engine upon a lapse of the predetermined time after the engine stop is requested. The control unit sets the predetermined time such that a sum of the predetermined time and an engine stop time as a time that is needed from start of the engine stop process to stop of operation of the internal combustion engine becomes equal to a valve timing control time as a time that is needed until the valve timing is made to coincide with the engine stop request-time target valve timing through the engine stop request-time valve timing control, or such that a sum of the predetermined time and the engine stop time becomes equal to a shortest time among times longer than the valve timing control time.

According to the aforementioned configuration, regardless of the length of the engine stop time or the length of the valve timing control time, the operation of the engine is stopped as soon as or almost as soon as the valve timing coincides with the engine stop request-time target valve timing through the engine stop request-time valve timing control. Thus, according to the configuration, the valve timing can be made to coincide with the engine stop request-time target valve timing when the operation of the internal combustion engine is stopped, and the fuel economy of the internal combustion engine can be restrained from deteriorating.

In the aforementioned control device, the control unit may estimate the engine stop time, and set the predetermined time from the estimated engine stop time and the valve timing control time.

In the control device, the control unit may estimates the estimated engine stop time as a time that increases as a rotational speed of the internal combustion engine increases.

In the aforementioned control device, in the case where a power unit is equipped with the internal combustion engine and an electric motor, and the internal combustion engine and the electric motor are coupled to each other, the control unit may estimate the estimated engine stop time as a time that increases as a rotational speed of the electric motor increases.

In the aforementioned control device, in the case where a vehicle is equipped with the internal combustion engine and an electric motor, and the internal combustion engine, the electric motor, and the vehicle are coupled to one another, the control unit may estimate the estimated engine stop time as a time that increases as a speed of the vehicle increases.

In a second aspect of the invention, a control method for an internal combustion that includes a variable valve timing mechanism that changes a valve timing. The method includes setting an engine stop request-time target valve timing as a target valve timing at a time when engine stop as stop of operation of the internal combustion engine is requested, starting engine stop request-time valve timing control as control of changing the valve timing such that the valve timing coincides with the engine stop request-time target valve timing when the engine stop is requested, operating the internal combustion engine in an idling state for a predetermined time after the engine stop is requested, and starting an engine stop process as a processing of stopping operation of the internal combustion engine upon a lapse of the predetermined time after the engine stop is requested. The control method also includes setting the predetermined time such that a sum of the predetermined time and an engine stop time as a time that is needed from start of the engine stop process to stop of operation of the internal combustion engine becomes equal to a valve timing control time as a time that is needed until the valve timing is made to coincide with the engine stop request-time target valve tuning through the engine stop request-time valve timing control, or such that a sum of the predetermined time and the engine stop time becomes equal to a shortest time among times longer than the valve timing control time.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a view showing an example of a relationship that is established between engine rotational speed and engine stop time when the internal combustion engine is operated in an idling state after engine stop is requested in the embodiments of the invention;

DETAILED DESCRIPTION OF EMBODIMENTS

Figure 1:
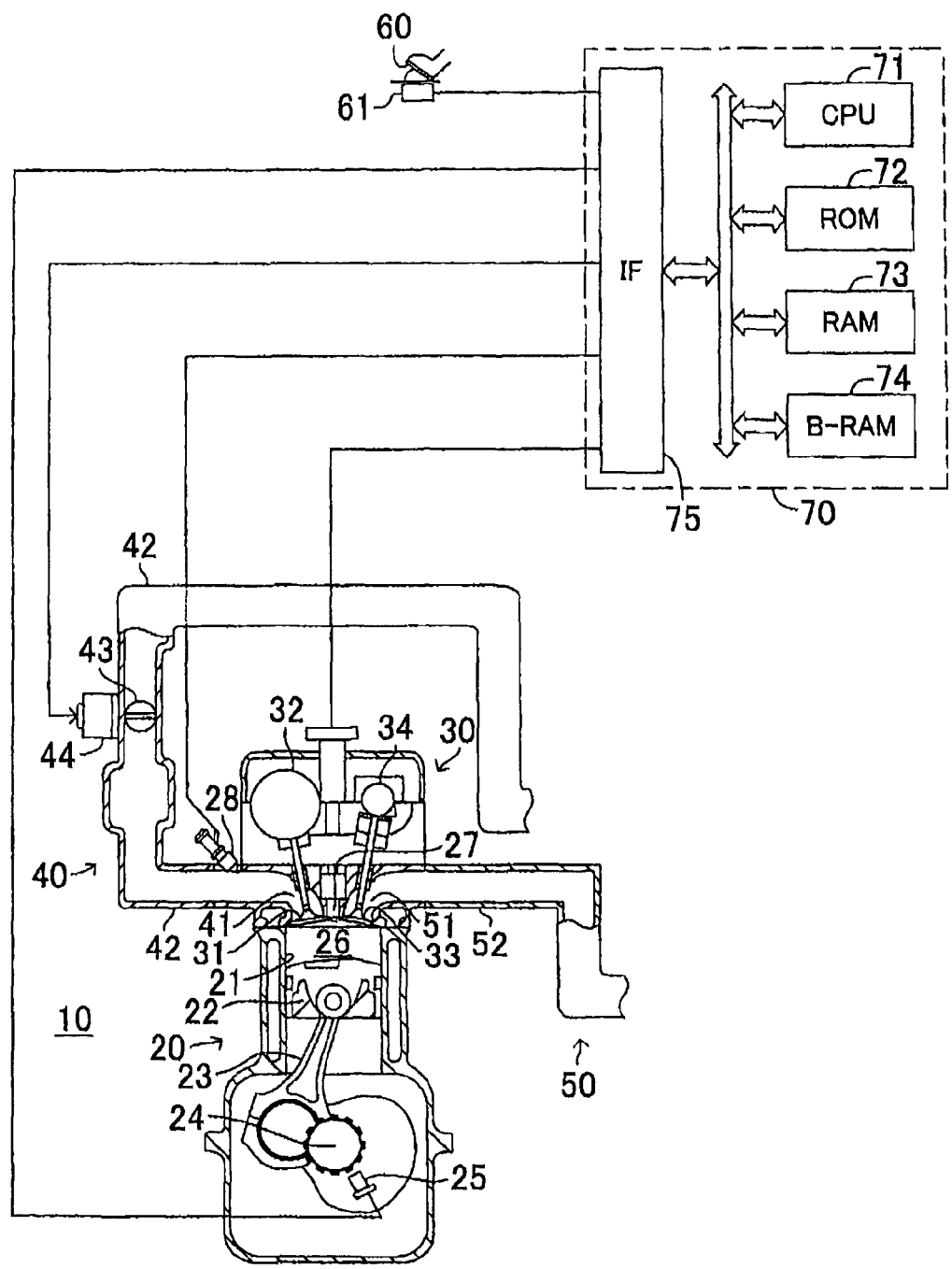
FIG. 1 is a view showing an internal combustion engine that is equipped with a control device according to the first embodiment of the invention.

A first embodiment of the invention will be described below. FIG. 1 shows an internal combustion engine that includes a control device according to the first embodiment of the invention. In FIG. 1, the internal combustion engine 10, an internal combustion engine body 20, a valve actuating mechanism 30, an intake passage 40, an exhaust passage 50, an accelerator pedal 60 and an electronic control unit 70 are also shown in FIG. 1. A cylinder 21, a piston 22, a connecting rod 23, a crankshaft 24, a crank angle sensor 25, a combustion chamber 26, an ignition plug 27 and a fuel injection valve 28 are also shown in FIG. 1. An intake valve 31, an intake valve actuating mechanism 32, an exhaust valve 33 and an exhaust valve actuating mechanism 34 are also shown in FIG. 1. An intake port 41, an intake pipe 42, a throttle valve 43, a throttle valve actuator 44, an exhaust port 51, an exhaust pipe 52 and an accelerator pedal operation amount sensor 61 are also shown in FIG. 1.

The electronic control unit 70 includes a microprocessor (CPU) 71, a read only memory (ROM) 72, a random access memory (RAM) 73, a backup RAM (B-RAM) 74 and an interface (IF) 75. These microprocessor 71, read only memory 72, random access memory 73, backup RAM 74 and interface 75 are electrically connected to one another via a bidirectional bus.

The piston 22 is arranged in the cylinder 21 so as to be reciprocally movable within the cylinder 21. The connecting rod 23 connects the piston 22 to the crankshaft 24. The crank angle sensor 25 is attached to the internal combustion engine body (hereinafter, referred to as engine body) 20 in proximity to the crankshaft 24, and has the function of outputting an output value corresponding to the rotation phase of the crankshaft 24. The ignition plug 27 is mounted on the engine body 20 such that the distal end of the ignition plug 27 is exposed to the inside of the combustion chamber 26. The fuel injection valve 28 is mounted at the intake pipe 42 in proximity to the intake port 41.

The fuel injection valve 28 is electrically connected to the interface 75, and injects fuel into the intake port 41 on the basis of a command signal from the electronic control unit 70. Fuel injected from the fuel injection valve 28 is introduced into the combustion chamber 26 together with air via the intake port 41. The ignition plug 27 is electrically connected to the interface 75, and ignites fuel in the combustion chamber 26 on the basis of a command signal from the electronic control unit 70. The piston 22 is reciprocally moved in the cylinder 21 as fuel combusts in the combustion chamber 26. The crankshaft 24 is rotated via the connecting rod 23 as the piston 22 reciprocally moves in the cylinder 21. The crank angle sensor 25 is electrically connected to the interface 75, and the output value of the crank angle sensor 25 is input to the electronic control unit 70. The electronic control unit 70 calculates the rotation speed of the internal combustion engine on the basis of the output value of the crank angle sensor 25.

The intake valve 31 is arranged on the engine body 20, and has the function of opening or closing the intake port 41. The intake valve actuating mechanism 32 is mounted on the engine body 20. The intake valve actuating mechanism 32 opens or closes the intake valve 31, and changes the valve timing of the intake valve 31. As the intake valve 31 is opened, the intake port 41 is opened. As the intake valve 31 is closed, the intake port 41 is closed. The valve timing of the intake valve 31 means both the valve open timing of the intake valve and the valve close timing of the intake valve.

The exhaust valve 33 is arranged on the engine body 20, and has the function of opening or closing the exhaust port 51. The exhaust valve actuating mechanism 34 is mounted on the engine body 20, and has the function of opening or closing the exhaust valve 33. As the exhaust valve 33 is opened, the exhaust port 51 is opened. As the exhaust valve 33 is closed, the exhaust port 51 is closed.

The valve actuating mechanism 30 includes the intake valve 31, the intake valve actuating mechanism 32, the exhaust valve 33, and the exhaust valve actuating mechanism 34.

The intake passage 40 is formed of the intake port 41 and the intake pipe 42, and has the function of supplying air to the combustion chamber 26. The intake port 41 is formed in the engine body 20. One end of the intake pipe 42 is connected to the intake port 41, and the other end of the intake pipe 42 is open to outside air. The throttle valve 43 is pivotably arranged in the intake pipe 42, and has the function of changing the flow passage area of the intake pipe 42. The throttle valve actuator 44 is connected to the throttle valve 43.

The throttle valve actuator 44 is electrically connected to the interface 75, and actuates the throttle valve 43 such that the flow passage area of the intake pipe 42 becomes a desired flow passage area in response to a control signal that is transmitted from the electronic control unit 70.

The exhaust passage 50 is formed of the exhaust port 51 and the exhaust pipe 52, and has the function of emitting exhaust gas, which is exhausted from the combustion chamber 26, to outside air. The exhaust port 51 is formed in the engine body 20. One end of the exhaust pipe 52 is connected to the exhaust port 51, and the other end of the exhaust pipe 52 is open to outside air.

The accelerator pedal 60 is connected to the accelerator pedal operation amount sensor 61. The accelerator pedal operation amount sensor 61 has the function of outputting an output value corresponding to the depression amount of the accelerator pedal 60. The accelerator pedal operation amount sensor 61 is electrically connected to the interface 75, and the output value of the accelerator pedal operation amount sensor 61 is input to the electronic control unit 70. The electronic control unit 70 calculates a required torque (that is, a torque that is required as a torque to be output from the internal combustion engine) on the basis of the output value of the accelerator pedal operation amount sensor 61.

Figure 2:
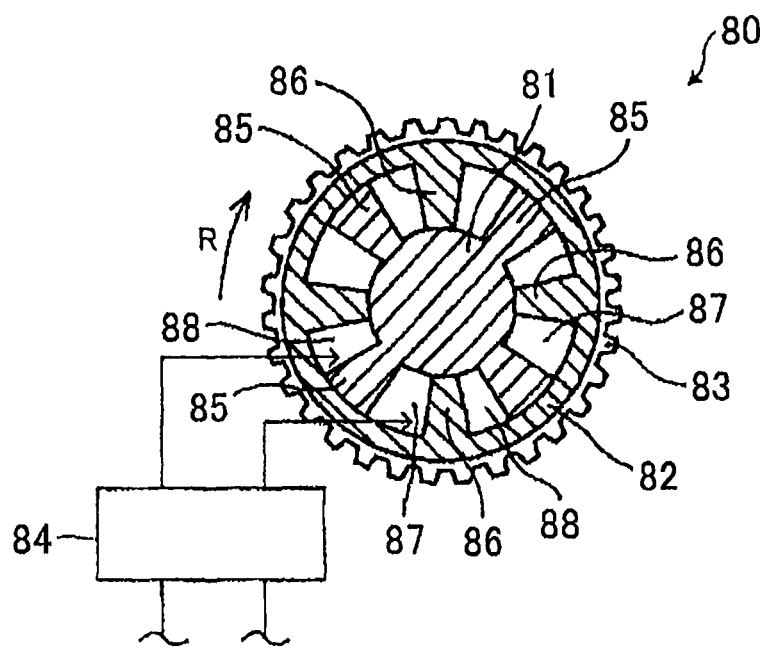
FIG. 2 is a view showing an variable intake valve timing mechanism of the first embodiment of the invention.

A mechanism for changing the valve timing of the intake valve in a valve actuating device according to the present embodiment (hereinafter, referred to as variable intake valve timing mechanism) will be described. The variable intake valve timing mechanism according to the present embodiment is shown in FIG. 2. In FIG. 2, the variable intake valve timing mechanism 80, an intake camshaft 81, a housing 82, a timing pulley 83 and a hydraulic actuator 84 are shown.

The housing 82 is accommodated inside the timing pulley 83 such that the outer peripheral wall surface of the housing 82 is in contact with the inner peripheral wall surface of the timing pulley 83. The timing pulley 83 is connected to the crankshaft 24 via a timing belt (not shown), and is rotated in a direction indicated by an arrow R via the timing pulley 83 through rotation of the crankshaft 24. The housing 82 is accommodated inside the timing pulley 83 so as to be non-rotatable with respect to the timing pulley 83.

A plurality of vanes 85 are provided on the outer peripheral wall surface of the intake camshaft 81. The plurality of vanes 85 extend radially outward to the inner peripheral wall surface of the housing 82. A plurality of partition walls 86 are provided on the inner peripheral wall surface of the housing 82. The plurality of partition walls 86 extend radially inward to the outer peripheral wall surface of the intake camshaft 81. A hydraulic chamber (hereinafter, referred to as advance-side hydraulic chamber) 87 is formed between each vane 85 and one of the two adjacent partition walls 86. On the other hand, a hydraulic chamber (hereinafter, referred to as a retard-side hydraulic chamber) 88 is formed between each vane 85 and the other one of the two adjacent partition walls 86.

The hydraulic actuator 84 supplies hydraulic fluid to the advance-side hydraulic chambers 87, and simultaneously drains hydraulic fluid from the retard-side hydraulic chambers 88. Alternatively, the hydraulic actuator 84 drains hydraulic fluid from the advance-side hydraulic chambers 87, and simultaneously supplies hydraulic fluid to the retard-side hydraulic chambers 88.

A cam (not shown) is provided on the intake camshaft 81, and the outer peripheral wall surface of the cam is in contact with the distal end of the intake valve 31. As the intake camshaft 81 rotates, the cam rotates. The intake valve 31 is opened or closed through the rotation of the cam. On the other hand, the exhaust valve actuating mechanism also includes an exhaust camshaft (not shown). A cam (not shown) is also provided on the exhaust camshaft. The outer periphery of the cam is in contact with the distal end of the exhaust valve 33. As the exhaust camshaft rotates, the cam rotates. The exhaust valve 33 is opened or closed through the rotation of the cam.

As the rotation of the crankshaft 24 is transmitted to the timing pulley 83 via the timing belt, the timing pulley 83 rotates. As the timing pulley 83 rotates, the housing 82 rotates together. As the housing 82 rotates, the partition walls 86 rotate together. Thus, the rotation of the housing 82 is transmitted to the vanes 85 via the advance-side hydraulic chambers 87. Then, the vanes 85 rotate, and the intake camshaft 81 rotates together with the vanes 85. By so doing, the intake valve 31 is opened or closed. As the timing pulley 83 rotates, the exhaust camshaft is also rotated. By so doing, the exhaust valve 33 is opened or closed.

As hydraulic fluid is supplied to the advance-side hydraulic chambers 87 and simultaneously hydraulic fluid is drained from the retard-side hydraulic chambers 88 by the hydraulic actuator 84, the intake camshaft 81 relatively rotates in the direction of the arrow R shown in FIG. 2 with respect to the housing 82. By so doing, the valve open timing and valve close timing of the intake valve 31 are changed to an earlier timing (that is, advanced). On the other hand, as hydraulic fluid is drained from the advance-side hydraulic chambers 87 and simultaneously hydraulic fluid is supplied to the retard-side hydraulic chambers 88 by the hydraulic actuator 84, the intake camshaft 81 relatively rotates in a direction opposite to the direction of the arrow R in FIG. 2 with respect to the housing 82. By so doing, the valve open timing and valve close timing of the intake valve 31 are changed to a later timing (that is, retarded).

Figure 3:
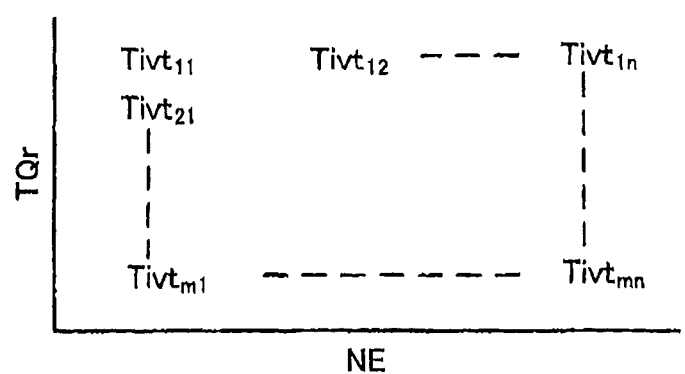
FIG. 3 is a view showing a map that is used to acquire a target valve timing in the first embodiment of the invention.

In the present embodiment, an appropriate valve open timing of the intake valve is obtained in advance through an experiment, or the like, on the basis of an operating state of the internal combustion engine, which is defined by an engine rotation speed and a required torque. As shown in FIG. 3, valve open timings obtained in form of a functional map of an engine rotation speed NE and a required torque TQr are stored in the electronic control unit 70 as target valve timings Tivt. During operation of the internal combustion engine, the target valve timing Tivt corresponding to the engine rotation speed NE at that instance and the required torque at that instance are acquired. The valve open timing of the intake valve is changed by the variable intake valve timing mechanism such that the valve open timing of the intake valve coincides with the acquired target valve timing Tivt. More specifically, when the current valve open timing of the intake valve is later than the target valve timing, hydraulic fluid is supplied to the advance-side hydraulic chambers and simultaneously hydraulic fluid is drained from the retard-side hydraulic chambers by the hydraulic actuator. By so doing, the valve open timing of the intake valve is advanced toward the target valve timing. When the valve open timing of the intake valve coincides with the target valve timing, supply of hydraulic fluid to the advance-side hydraulic chambers and drain of hydraulic fluid from the retard-side hydraulic chambers by the hydraulic actuator are stopped. On the other hand, when the current valve open timing of the intake valve is earlier than the target valve timing, hydraulic fluid is drained from the advance-side hydraulic chambers and simultaneously hydraulic fluid is supplied to the retard-side hydraulic chambers by the hydraulic actuator. By so doing, the valve open timing of the intake valve is retarded toward the target valve timing. When the valve open timing of the intake valve coincides with the target valve timing, drain of hydraulic fluid from the advance-side hydraulic chambers and supply of hydraulic fluid to the retard-side hydraulic chambers by the hydraulic actuator are stopped.

In the present embodiment, when the valve open timing of the intake valve 31 is determined, the valve close timing of the intake valve 31 is uniquely determined, so a target valve timing related to the valve close timing of the intake valve 31 is not set.

Engine stop control according to the present embodiment will be described below. Engine stop control is control that is started when a request to stop engine operation is issued. In the following description, "idling operation" is "engine operation that is able to keep a minimum required engine rotation speed for maintaining engine operation".

In the present embodiment, a target valve timing at the time when an engine stop request is issued (hereinafter, referred to as engine stop request target valve timing) is determined in advance, When an engine stop request is issued, the engine stop request target valve timing is set to the target valve timing. Control for changing the valve open timing of the intake valve such that the valve open timing of the intake valve coincides with the engine stop request target valve timing (hereinafter, referred to as engine stop request valve timing control) is started. The internal combustion engine is operated in an idling state for a predetermined time (hereinafter referred to as a predetermined idling extension time) after engine stop is requested. Upon the lapse of the predetermined idling extension time after engine stop is requested, a processing of stopping engine operation (hereinafter referred to as an engine stop process) is started. Engine stop request-time valve timing control can be performed until the operation of the engine is stopped, and is not performed when the operation of the engine is stopped. In the engine stop process, for example, the injection of fuel from the fuel injection valve is stopped, and the ignition of fuel by the ignition plug is stopped.

The predetermined idling extension time of this embodiment of the invention will be described. In this embodiment of the invention, the predetermined idling extension time is set such that the sum of the predetermined idling extension time and a time that is needed from the start of the engine stop process to the stop of the operation of the engine (hereinafter referred to as an engine stop time) becomes equal to a time that is needed to make the valve-opening timing of the intake valve coincide with the engine stop request-time target valve timing through engine stop request-time valve timing control (hereinafter referred to as a valve timing control time), or such that the sum of the predetermined idling extension time and the engine stop time becomes equal to a shortest time among times longer than the valve timing control time (i.e., such that the sum of the predetermined idling extension time and the engine stop time becomes substantially equal to the valve timing control time while remaining longer than the valve timing control time).

According to this embodiment of the invention, the following effect is obtained. That is, the engine stop time differs depending on the engine operation state at the time when the engine stop process is started, and the valve timing control time differs depending on the engine stop request-time target valve timing and the valve-opening timing of the intake valve at the time when engine stop is requested. In the case where the engine operation processing is started upon the lapse of a certain time after engine stop is requested, when the engine stop time is relatively long or when the valve timing control time is relatively short, the valve-opening timing of the intake valve may reach the engine stop request-time target valve timing before the operation of the engine is stopped. In this case, the fuel economy of the internal combustion engine may deteriorate in accordance with idling operation of the internal combustion engine. Alternatively, when the engine stop time is relatively short or when the valve timing control time is relatively long, the operation of the engine may be stopped before the valve-opening timing of the intake valve reaches the engine stop request-time target valve timing. In this case, it may be impossible to make the valve-opening timing of the intake valve reach the engine stop request-time target valve timing. In this embodiment of the invention, the predetermined idling extension time is set such that the sum of the predetermined idling extension time and the engine stop time becomes equal to the valve timing control time, or such that the sum of the predetermined idling extension time and the engine stop time becomes equal to a shortest time among times longer than the valve timing control time. Accordingly, the operation of the engine is stopped as soon as or almost as soon as the valve timing coincides with the engine stop request-time target valve timing through engine stop request-time valve timing control, regardless of the length of the engine stop time. Thus, according to this embodiment of the invention, when the operation of the engine is stopped, the valve-opening timing of the intake valve can be made to coincide with the engine stop request-time target valve timing, and the fuel economy of the internal combustion engine can be restrained from deteriorating.

Figure 4:
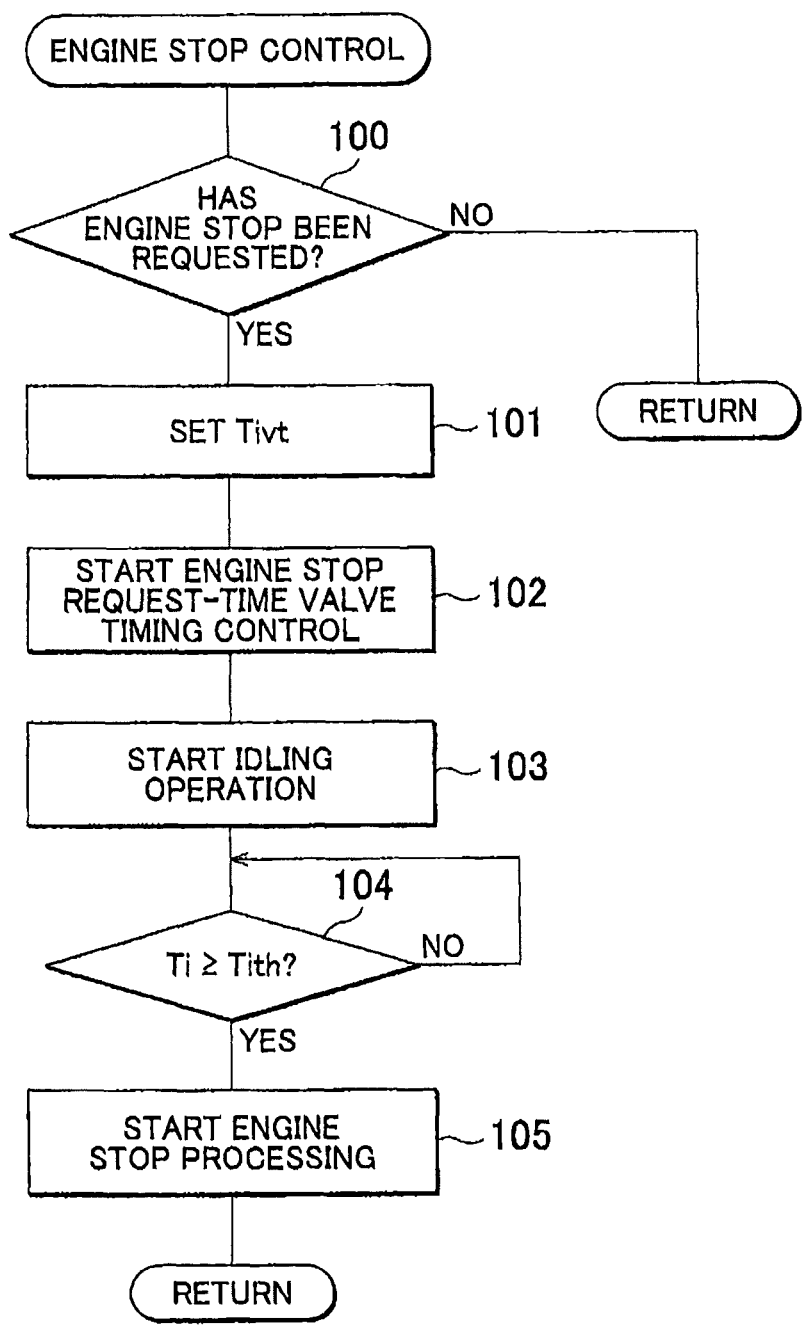
FIG. 4 is a view showing an example of a routine for performing engine stop control of the first embodiment of the invention.

An example of a routine that executes engine stop control according to the present embodiment will be described below. An example of the routine is shown in FIG. 4. The routine is started at predetermined intervals.

When the routine of FIG. 4 is started, it is determined in step 100 whether or not engine stop has been requested. If it is determined that engine stop has been requested, the routine proceeds to step 101. On the other hand, if it is determined that engine stop has not been requested, the routine ends.

In step 101, the engine stop request-time target valve timing is set as the target valve timing Tivt. Subsequently in step 102, engine stop request-time valve timing control is started. Subsequently in step 103, idling operation of the internal combustion engine is started. Subsequently, it is determined in step 104 whether or not a time Ti that has elapsed after the start of idling operation in step 103 is equal to or longer than the predetermined idling extension time Tith (Ti≥Tith). If it is determined that Ti≥Tith, the routine proceeds to step 105. The engine stop process is started, and then the routine ends. On the other hand, if it is determined that Ti<Tith, the routine returns to step 104.

In engine stop control of the foregoing embodiment of the invention, the engine stop process may be started even if the predetermined idling extension time has not elapsed after the start of idling operation of the internal combustion engine when the valve-opening timing of the intake valve reaches the engine stop request-time target valve timing.

Figure 5:
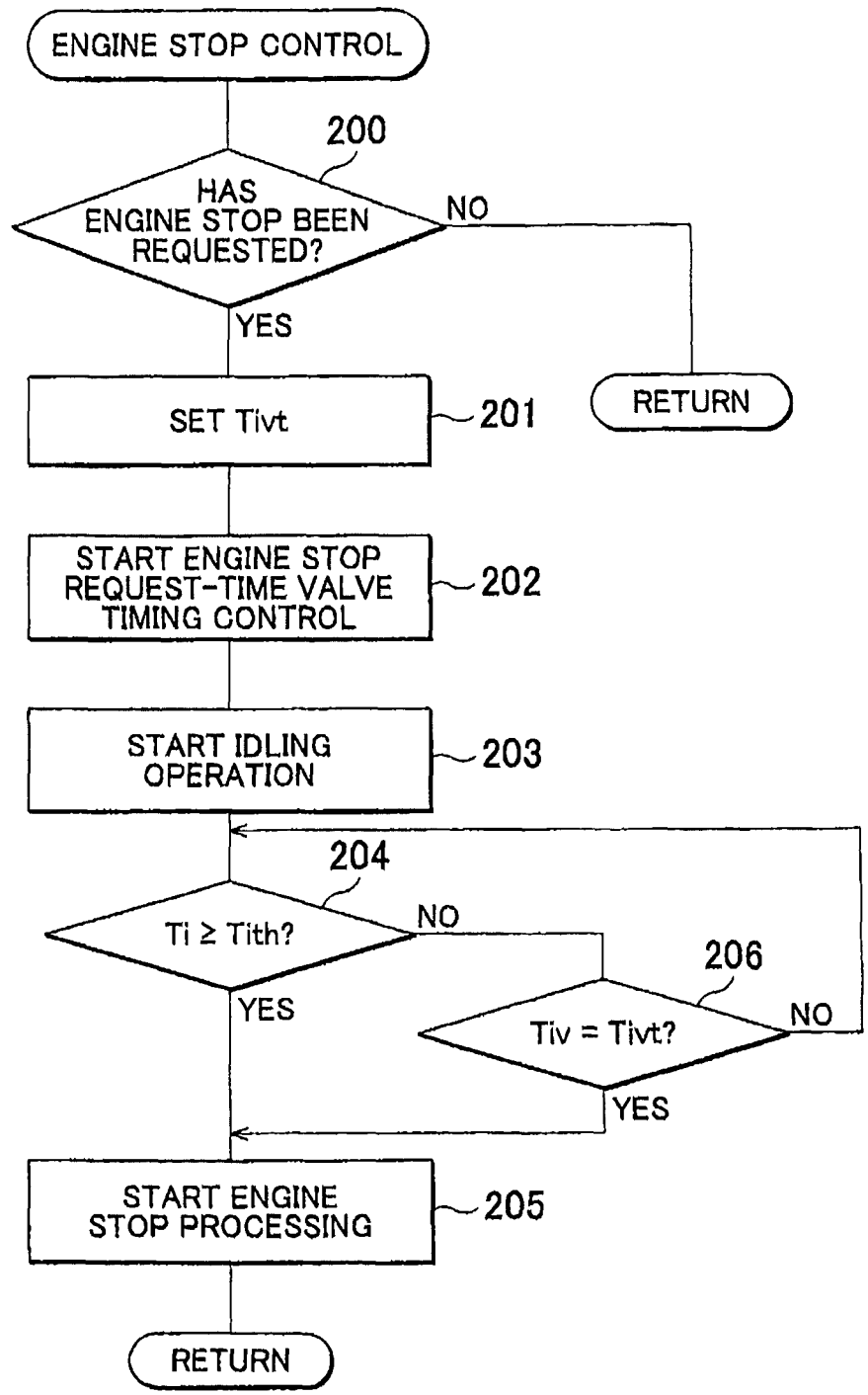
FIG. 5 is a view showing another example of the routine for performing engine stop control of the first embodiment of the invention.

An example of a routine for performing engine stop control in this case is shown in FIG. 5. This routine is started on a predetermined cycle. Because steps 200 to 203 of FIG. 5 are identical to steps 100 to 103 of FIG. 4 respectively, the description of these steps is omitted.

In step 204 of FIG. 5, it is determined whether or not the time Ti that has elapsed after the start of idling operation in step 203 is equal to or longer than the predetermined idling extension time Tith (Ti≥Tith). If it is determined herein that Ti≥Tith, the routine proceeds to step 205. On the other hand, if it is determined that Ti<Tith, the routine proceeds to step 206.

It is determined in step 206 whether or not the current valve-opening timing Tiv of the intake valve coincides with the target valve timing Tivt (Tiv=Tivt). If it is determined herein that Tiv=Tivt, the routine proceeds to step 205. On the other hand, if it is determined that Tiv≠Tivt, the routine returns to step 204.

In step 205, the engine stop process is started, and then the routine ends.

In engine stop control of the foregoing embodiment of the invention, even if the valve-opening timing of the intake valve has not reached the engine stop request-time target valve timing before the engine stop process is started, the valve-opening timing of the intake valve that can sufficiently reach this engine stop request-time target valve timing before the operation of the engine is stopped may be set as an engine stop process start permission valve timing. In this case, when the valve-opening timing of the intake valve reaches the engine stop process start permission valve timing, the engine stop process may be started, even if the predetermined idling extension time has not elapsed after the start of idling operation of the internal combustion engine.

Figure 6:
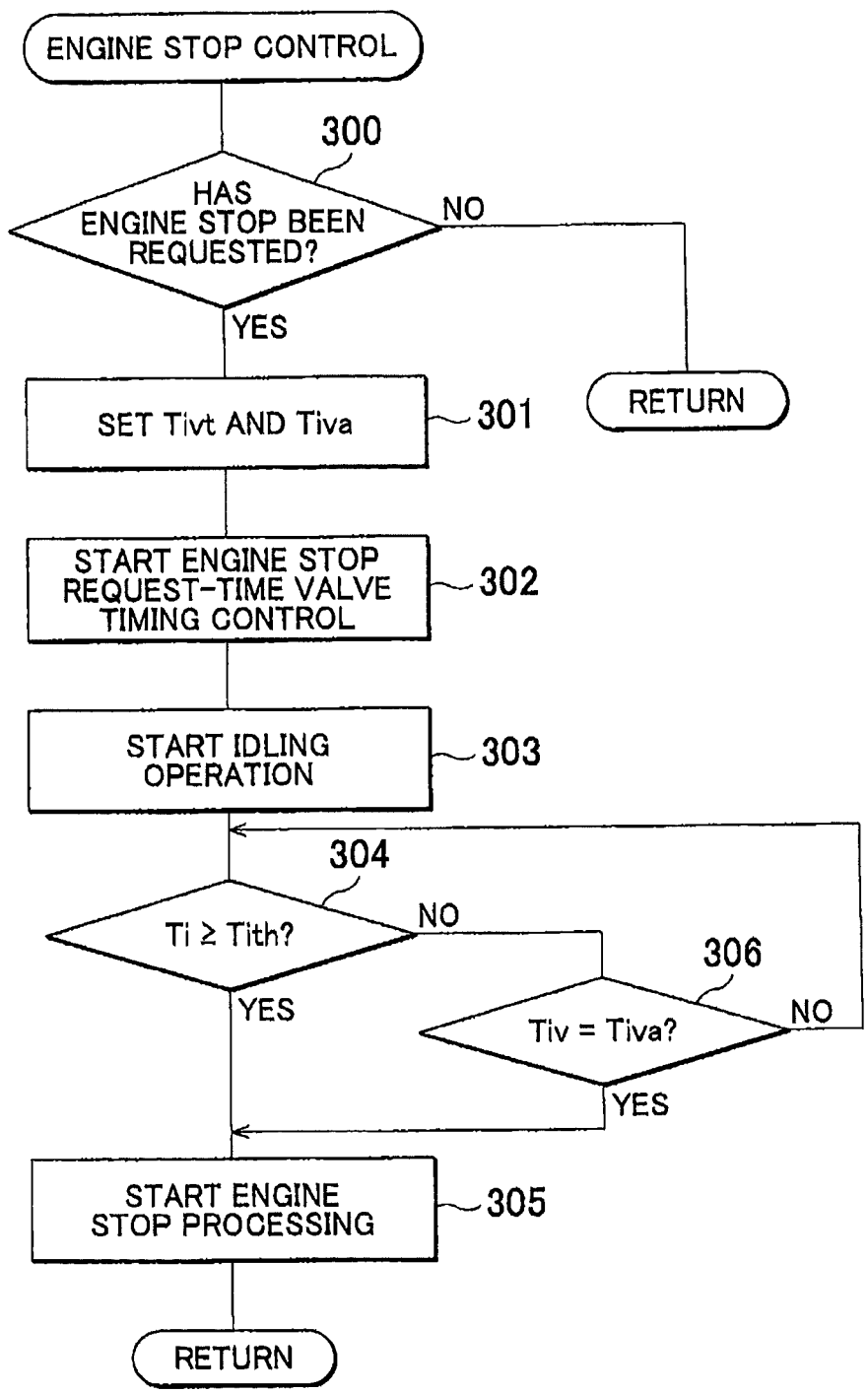
FIG. 6 is a view showing still another example of the routine for performing engine stop control of the first embodiment of the invention.

An example of a routine for performing engine stop control in this case is shown in FIG. 6. This routine is started on a predetermined cycle.

When the routine of FIG. 6 is started, it is determined in step 300 whether or not engine stop has been requested. If it is determined that engine stop has been requested, the routine proceeds to step 301. On the other hand, if it is determined that engine stop has not been requested, the routine ends.

In step 301, the engine stop request-time target valve timing is set as the target valve timing Tivt, and an engine stop process start permission valve timing Tiva is set. Subsequently in step 302, engine stop request-time valve timing control is started. Subsequently in step 303, idling operation of the internal combustion engine is started. Subsequently, it is determined in step 304 whether or not the time Ti that has elapsed after the start of idling operation in step 303 is equal to or longer than the predetermined idling extension time Tith (Ti≥Tith). If it is determined that Ti≥Tith, the routine proceeds to step 305. On the other hand, if it is determined that Ti<Tith, the routine proceeds to step 306.

It is determined in step 306 whether or not the current valve-opening timing Tiv of the intake valve coincides with the engine stop process start permission valve timing Tiva (Tiv=Tiva). If it is determined that Tiv=Tiva, the routine proceeds to step 305. On the other hand, if it is determined that Tiv≠Tiva, the routine returns to step 304.

In step 305, the engine stop process is started, and then the routine ends.

In the foregoing embodiment of the invention, the method of setting the predetermined idling extension time is not limited in particular. For example, the engine stop time may be estimated from various parameters regarding the operation of the internal combustion engine, and the predetermined idling extension time may be set using the engine stop time thus estimated and the valve timing control time. More specifically, a method of setting a time that is calculated by subtracting the aforementioned estimated engine stop time from the valve timing control time as the predetermined idling extension time may be adopted as the method of setting the predetermined idling extension time. In this case, the valve timing control time may be estimated from various parameters regarding the operation of the internal combustion engine.

As the engine rotational speed increases, the friction and inertial force regarding the operation of the engine increase, and the time that is needed from the start of the engine stop process to the stop of the operation of the engine increases. Thus, in the case where the engine stop time is estimated from various parameters regarding the operation of the engine as described above, the aforementioned estimated engine stop time Tes may be increased as the engine rotational speed NEi at the time when the internal combustion engine is operated in an idling state after engine stop is requested increases, as shown in, for example, FIG. 7.

The foregoing first embodiment of the invention is an embodiment in the case where the invention is applied to the internal combustion engine. In the second embodiment of the invention, a case where the invention is applied to a power unit (or a hybrid system) that is equipped with an internal combustion engine and an electric motor will be described hereinafter.

Figure 8:
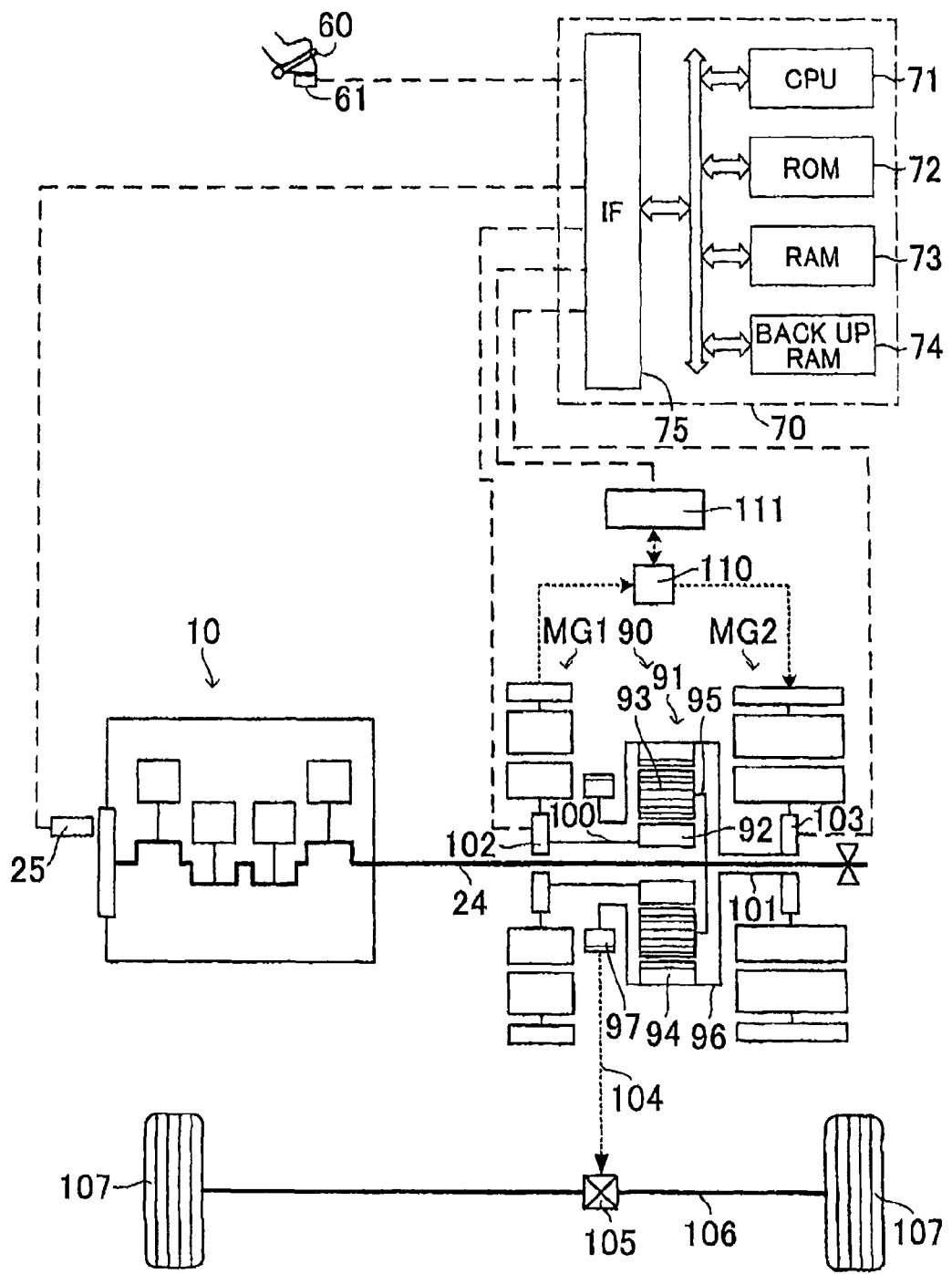
FIG. 8 is a view showing a power unit of the second embodiment of the invention.

A vehicle that is equipped with the power unit of the second embodiment of the invention is shown in FIG. 8. In FIG. 8, motor generators MG1 and MG2 (hereinafter, referred to as first motor generator and second motor generator), the internal combustion engine 10, the crankshaft (output shaft) 24, the crank angle sensor 25, a power distribution mechanism 90, an inverter 110, a battery 111, the accelerator pedal 60, the accelerator pedal operation amount sensor 61 and the electronic control unit 70 are shown. Note that the internal combustion engine 10 shown in FIG. 8 includes the same components as those of the internal combustion engine 10 shown in FIG. 1.

The power distribution mechanism 90 includes a planetary gear unit 91. The planetary gear unit 91 includes a sun gear 92, planetary gears 93 and a ring gear 94. The planetary gears 93 are in mesh with the sun gear 92, and are in mesh with the ring gear 94. The sun gear 92 is connected to a shaft (hereinafter, referred to as first shaft) 100 of the first motor generator MG1. Thus, the first motor generator MG1 can be driven for rotation by torque that is input from the sun gear 92 to the first motor generator MG1, and is able to output torque to the sun gear 92. The first motor generator MG1 is able to generate electric power as it is driven for rotation by torque that is input from the sun gear 92 to the first motor generator MG1. The ring gear 94 is connected to a shaft (hereinafter, referred to as second shaft) 101 of the second motor generator MG2 via a ring gear carrier 96. Thus, the second motor generator MG2 is able to output torque to the ring gear 94, and can be driven for rotation by torque that is input from the ring gear 94 to the second motor generator MG2. The second motor generator MG2 is able to generate electric power as it is driven for rotation by torque that is input from the ring gear 94 to the second motor generator MG2.

The planetary gears 93 are connected to the crankshaft 24 via a planetary gear carrier 95. Thus, the planetary gears 93 are driven for rotation by torque that is input from the crankshaft 24 to the planetary gears 93. The planetary gears 93 are in mesh with the sun gear 92 and the ring gear 94. Thus, when torque is input from the planetary gears 93 to the sun gear 92, the sun gear 92 is driven for rotation by the torque. When torque is input from the planetary gears 93 to the ring gear 94, the ring gear 94 is driven for rotation by the torque. Conversely, when torque is input from the sun gear 92 to the planetary gears 93, the planetary gears 93 are driven for rotation by the torque. When torque is input from the ring gear 94 to the planetary gears 93, the planetary gears 93 are driven for rotation by the torque.

The ring gear 94 is connected to an output gear 97 via the ring gear carrier 96. Thus, the output gear 97 is driven for rotation by torque that is input from the ring gear 94 to the output gear 97, and the ring gear 94 is driven for rotation by torque that is input from the output gear 97 to the ring gear 94.

The first motor generator MG1 includes a resolver 102. The resolver 102 is connected to the interface 75 of the electronic control unit 70. The resolver 102 outputs an output value corresponding to the rotation angle of the first motor generator MG1. The output value is input to the electronic control unit 70. The electronic control unit 70 calculates the rotation speed (hereinafter, referred to as first MG rotation speed) of the first motor generator on the basis of the output value. The second motor generator MG2 includes a resolver 103. The resolver 103 is connected to the interface 75 of the electronic control unit 70. The resolver 103 outputs an output value corresponding to the rotation angle of the second motor generator. The output value is input to the electronic control unit 70. The electronic control unit 70 calculates the rotation speed (hereinafter, referred to as second MG rotation speed) of the second motor generator on the basis of the output value.

The first motor generator MG1 is electrically connected to the battery 111 via the inverter 110. Thus, when the first motor generator MG1 is generating electric power, electric power generated by the first motor generator MG1 (hereinafter, referred to as first generated electric power) can be supplied to the battery 111 via the inverter 110. The first motor generator MG1 can be driven for rotation by electric power that is supplied from the battery 111, and the rotation speed of the first motor generator MG1 is controllable by controlling a control torque (hereinafter, referred to as first control torque) that is applied to the first motor generator MG1 using electric power that is supplied from the battery 111.

The second motor generator MG2 is electrically connected to the battery 111 via the inverter 110. The second motor generator MG2 can be driven for rotation by electric power that is supplied from the battery 111, and the rotation speed of the second motor generator MG2 is controllable by controlling a control torque (hereinafter, referred to as second control torque) that is applied to the second motor generator MG2 using electric power that is supplied from the battery 111. When the second motor generator MG2 is generating electric power, electric power generated by the second motor generator MG2 (hereinafter, referred to as second generated electric power) can be supplied to the battery 111 via the inverter 110. The first generated electric power can be directly supplied to the second motor generator MG2, and the second generated electric power can be directly supplied to the first motor generator MG1.

The battery 111 is connected to the interface 75 of the electronic control unit 70. Information about the amount of electric power that is stored in the battery 111 is input to the interface 75 of the electronic control unit 70. Although not shown in the drawing, the inverter 110 is connected to the interface 75 of the electronic control unit 70. The amount of electric power that is supplied from the inverter 110 to the second motor generator MG2 and the amount of electric power that is supplied from the inverter 110 to the first motor generator MG1 are controlled by a command that is transmitted from the electronic control unit 70 via the interface 75.

The output gear 97 is connected to a differential gear 105 via a gear train 104, The differential gear 105 is connected to a drive shaft 106. Drive wheels 107 are respectively connected to both ends of the drive shaft 106. Thus, torque from the output gear 97 is transmitted to the drive wheels 107 via the gear train 104, the differential gear 105 and the drive shaft 106.

In this embodiment of the invention, a required power that is required for the power unit is calculated on the basis of the accelerator pedal operation amount and the vehicle speed. The power unit of this embodiment of the invention is formed of the internal combustion engine 10, the first motor generator MG1 and the second motor generator MG2.

In this embodiment of the invention, a power that is output from the internal combustion engine within the required power is calculated as a required engine power. An engine operation point at which fuel economy is maximum when the required engine power is caused to output from the crankshaft is obtained in advance by an experiment, or the like, as an optimal engine operation point for each required engine power. These optimal engine operation points are plotted on a graph that is defined by an engine torque and an engine rotation speed, and these optimal engine operation points are connected. The thus formed line is obtained as an optimal engine operation line. The optimal engine operation line is stored in the electronic control unit. A required engine power is calculated during engine operation, and an engine operation point in the optimal engine operation line, at which it is possible to output the calculated required engine power from the internal combustion engine, is selected. The engine torque and the engine rotation speed that define the selected engine operation point are respectively set for a target engine torque and a target engine rotation speed. The fuel injection amount and the engine rotation speed are controlled such that the set target engine torque and target engine rotation speed are achieved.

When the required engine power calculated during engine operation is zero, the engine operation is stopped, and the required power is output from the power unit using only power from the first motor generator or the second motor generator or both of the first motor generator and the second motor generator.

When the second MG rotation speed is constant, as the first MG rotation speed changes, the engine rotation speed also changes. In other words, it is possible to control the engine rotation speed by controlling the first MG rotation speed. Where the first MG rotation speed is denoted by NM1, the second MG rotation speed is denoted by NM2, the engine rotation speed is denoted by NE and the ratio of the number of teeth of the sun gear to the number of teeth of the ring gear (that is, the number of teeth of the sun gear/the number of teeth of the ring gear) is denoted by $\rho$, the relationship expressed by the following mathematical expression (1) holds between the first MG rotation speed and the engine rotation speed. Where the target first MG rotation speed is denoted by NM1$t$ and the target engine rotation speed is denoted by NE$t$, the relationship expressed by the following mathematical expression (2) holds between the target first MG rotation speed and the target engine rotation speed.

$$NM1 = (NE - NM2)/\rho + NE \quad (1)$$

$$NM1t = (NEt - NM2)/\rho + NEt \quad (2)$$

In this embodiment of the invention, the target first MG rotation speed NM1$t$ is calculated from the above mathematical expression (2) using the target engine rotation speed NEt, which is set in accordance with the engine operation point that is selected in accordance with the required output, and the current second MG rotation speed NM2. A deviation (=NM1$t$−NM1) of the current first MG rotation speed NM1 with respect to the calculated target first MG rotation speed NM1$t$ is calculated. The first control torque is controlled such that the calculated deviation becomes zero.

Where an engine torque is denoted by TQE, an engine torque that is input to the ring gear (or the drive wheels) (hereinafter, referred to as ring gear input engine torque) is denoted by TQEr and the ratio of the number of teeth of the sun gear to the number of teeth of the ring gear (that is, the number of teeth of the sun gear/the number of teeth of the ring gear) is denoted by ρ, the relationship expressed by the following mathematical expression (3) holds between the ring gear input engine torque and the engine torque.

$$TQEr=1/(1+\rho)\times TQE \quad (3)$$

That is, the ring gear input engine torque TQEr is part of the engine torque TQE. Thus, the ring gear input engine torque TQEr is smaller than the required driving torque (that is, torque that should be input to the drive wheels 107). In the present embodiment, the second control torque is controlled such that a torque corresponding to the difference between the required driving torque and the ring gear input engine torque TQEr is input from the second motor generator to the ring gear, and a torque equal to the required driving torque is input to the ring gear.

Figure 9A:
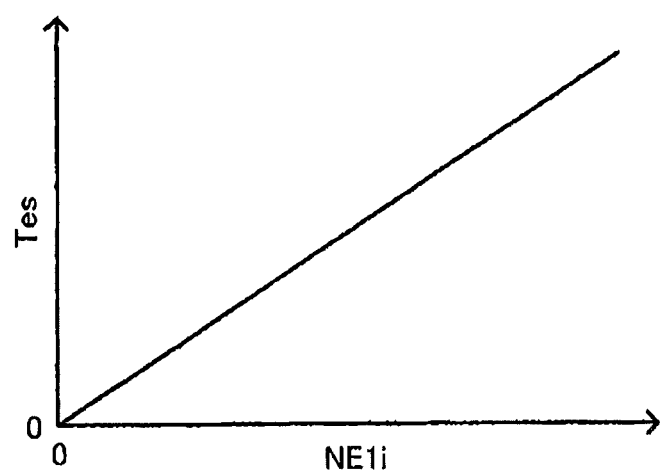
FIG. 9A is a view showing an example of a relationship that is established between rotational speed of a first generator motor and engine stop time when the internal combustion engine is operated in an idling state after engine stop is requested in the second embodiment of the invention.

The engine rotational speed tends to increase as the rotational speed of the first generator motor increases. As a result, the friction and inertial force regarding the operation of the engine increase, and the time that is needed from the start of the engine stop process to the stop of the operation of the engine increases. In the case where the engine stop time is estimated from various parameters regarding the operation of the engine as described above, the estimated engine stop time Tes may be so set as to increase as a rotational speed of the first generator motor at the time when the internal combustion engine is operated in an idling state after engine stop is requested (preferably, a rotational speed of the first generator motor at a time point that is as late as possible while the internal combustion engine is operated in an idling state after engine stop is requested) NM1$i$ increases as shown in, for example, FIG. 9A.

Figure 9B:
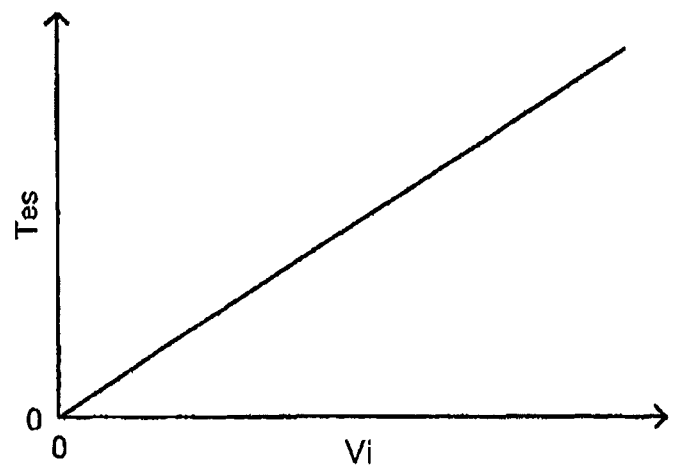
FIG. 9B is a view showing an example of a relationship that is established between speed of a vehicle and engine stop time when the internal combustion engine is operated in an idling state after engine stop is requested in the second embodiment of the invention.

Alternatively, the estimated engine stop time Tes may be made to increase as a speed of the vehicle at the time when the internal combustion engine is operated in an idling state after engine stop is requested (preferably, a speed of the vehicle at a time point that is as late as possible while the internal combustion engine is operated in an idling state after engine stop is requested) Vi increases as shown in, for example, FIG. 9B.

This embodiment of the invention is an embodiment in the case where the invention is applied to the power unit or the vehicle shown in FIG. 8. The invention is widely applicable to a power unit equipped with an internal combustion engine and an electric motor that are coupled to each other, or to a vehicle equipped with this power unit. The invention is applicable to a vehicle that is equipped with an internal combustion engine and an electric motor with the internal combustion engine, the electric motor, and the vehicle coupled to one another.

Each of the foregoing embodiments of the invention is an embodiment in the case where the invention is applied to the internal combustion engine equipped with the variable intake valve timing mechanism that changes the valve-opening timing of the intake valve and the valve-closing timing of the intake valve. However, the invention is also applicable to an internal combustion engine equipped with an variable intake valve timing mechanism that changes one of the valve-opening timing of the intake valve and the valve-closing timing of the intake valve.

Each of the foregoing embodiments of the invention is an embodiment in the case where the invention is applied to the internal combustion engine that includes the variable intake valve timing mechanism that changes the valve timing by hydraulic pressure. The invention is also applicable to an internal combustion engine that includes a variable intake valve timing mechanism that changes the valve timing by means of other than hydraulic pressure, as long as it takes a certain time to reach the target valve timing from the start of changing the valve timing of the intake valve.

Each of the foregoing embodiments of the invention is an embodiment in the case where the invention is applied to the internal combustion engine that includes the variable intake valve timing mechanism that changes the valve timing of the intake valve. The invention is also applicable to an internal combustion engine that includes a variable exhaust valve timing mechanism that changes the valve timing of the exhaust valve instead of the variable intake valve timing mechanism. In this case, the exhaust valve actuating mechanism has the function of opening or closing the exhaust valve and the function of changing the valve timing of the exhaust valve. In this case, the same configuration as the configuration of the variable intake valve timing mechanism described with reference to FIG. 2 may be, for example, employed as the configuration of the variable exhaust valve timing mechanism.

Each of the foregoing embodiments of the inventions an embodiment in the case where the invention is applied to a spark ignition internal combustion engine (so-called gasoline engine). The invention is also applicable to a compression ignition internal combustion engine (so-called diesel engine).

What is claimed is:

1. A control device for an internal combustion engine that includes variable valve timing mechanism that changes a valve timing, the control device comprising:
   a control unit that controls changing of the valve timing, wherein the control unit sets an engine stop request-time target valve timing that is a target valve timing at a time when engine stop as stop of operation of the internal combustion engine is requested, the control unit starts engine stop request-time valve timing control as control of changing the valve timing such that the valve timing coincides with the engine stop request-time target valve timing when the engine stop is requested,
   the control unit operates the internal combustion engine in an idling state for a predetermined time after the engine stop is requested, and
   the control unit starts an engine stop process as a processing of stopping operation of the internal combustion engine upon a lapse of the predetermined time after the engine stop is requested, and
   the control unit sets the predetermined time such that a sum of the predetermined time and an engine stop time as a time required from start of the engine stop process to stop of operation of the internal combustion engine becomes equal to a valve timing control time as a time that is needed until the valve timing is made to coincide with the engine stop request-time target valve timing through the engine stop request-time valve timing control.

2. The control device for the internal combustion engine according to claim 1, wherein the control unit estimates the engine stop time, and sets the predetermined time from the estimated engine stop time and the valve timing control time.

3. The control device for the internal combustion engine according to claim 2, wherein
the control unit estimates the estimated engine stop time as a time that increases as a rotational speed of the internal combustion engine increases.

4. The control device for the internal combustion engine according to claim 3, wherein
a power unit is equipped with the internal combustion engine and an electric motor,
the internal combustion engine and the electric motor are coupled to each other, and
the control unit estimates the estimated engine stop time as a time that increases as a rotational speed of the electric motor increases.

5. The control device for the internal combustion engine according to claim 3, wherein
a vehicle is equipped with the internal combustion engine and an electric motor,
the internal combustion engine, the electric motor, and the vehicle are coupled to one another, and the control unit estimates the estimated engine stop time as a time that increases as a speed of the vehicle increases.

6. The control device for the internal combustion engine according to claim 2, wherein
the control unit estimates the estimated engine stop time as a time that increases as a rotational speed of the internal combustion engine increases.

7. The control device for the internal combustion engine according to claim 2, wherein
a power unit is equipped with the internal combustion engine and an electric motor,
the internal combustion engine and the electric motor are coupled to each other, and
the control unit estimates the estimated engine stop time as a time that increases as a rotational speed of the electric motor increases.

8. The control device for the internal combustion engine according to claim 2, wherein
a vehicle is equipped with the internal combustion engine and an electric motor,
the internal combustion engine, the electric motor, and the vehicle are coupled to one another, and
the control unit estimates the estimated engine stop time as a time that increases as a speed of the vehicle increases.

9. A control method for an internal combustion engine that includes a variable valve timing mechanism that changes a valve timing, the control method comprising:
setting an engine stop request-time target valve timing as a target valve timing at a time when engine stop as stop of operation of the internal combustion engine is requested;
starting engine stop request-time valve timing control as control of changing the valve timing such that the valve timing coincides with the engine stop request-time target valve timing when the engine stop is requested;
operating the internal combustion engine in an idling state for a predetermined time after the engine stop is requested;
starting an engine stop process as a processing of stopping operation of the internal combustion engine upon a lapse of the predetermined time after the engine stop is requested; and
setting the predetermined time such that a sum of the predetermined time and an engine stop time as a time that is needed from start of the engine stop process to stop of operation of the internal combustion engine becomes equal to a valve timing control time as a time that is needed until the valve timing is made to coincide with the engine stop request-time target valve timing through the engine stop request-time valve timing control.

10. A control device for an internal combustion engine that includes variable valve timing mechanism that changes a valve timing, the control device comprising:
a control unit that controls changing of the valve timing, wherein the control unit sets an engine stop request-time target valve timing that is a target valve timing at a time when engine stop as stop of operation of the internal combustion engine is requested, the control unit starts engine stop request-time valve timing control as control of changing the valve timing such that the valve timing coincides with the engine stop request-time target valve timing when the engine stop is requested,
the control unit operates the internal combustion engine in an idling state for a predetermined time after the engine stop is requested, and
the control unit starts an engine stop process as a processing of stopping operation of the internal combustion engine upon a lapse of the predetermined time after the engine stop is requested, and
the control unit sets the predetermined time such that a sum of the predetermined time and the engine stop time becomes equal to a shortest time among times longer than the valve timing control time.

* * * * *